Patented Dec. 15, 1936

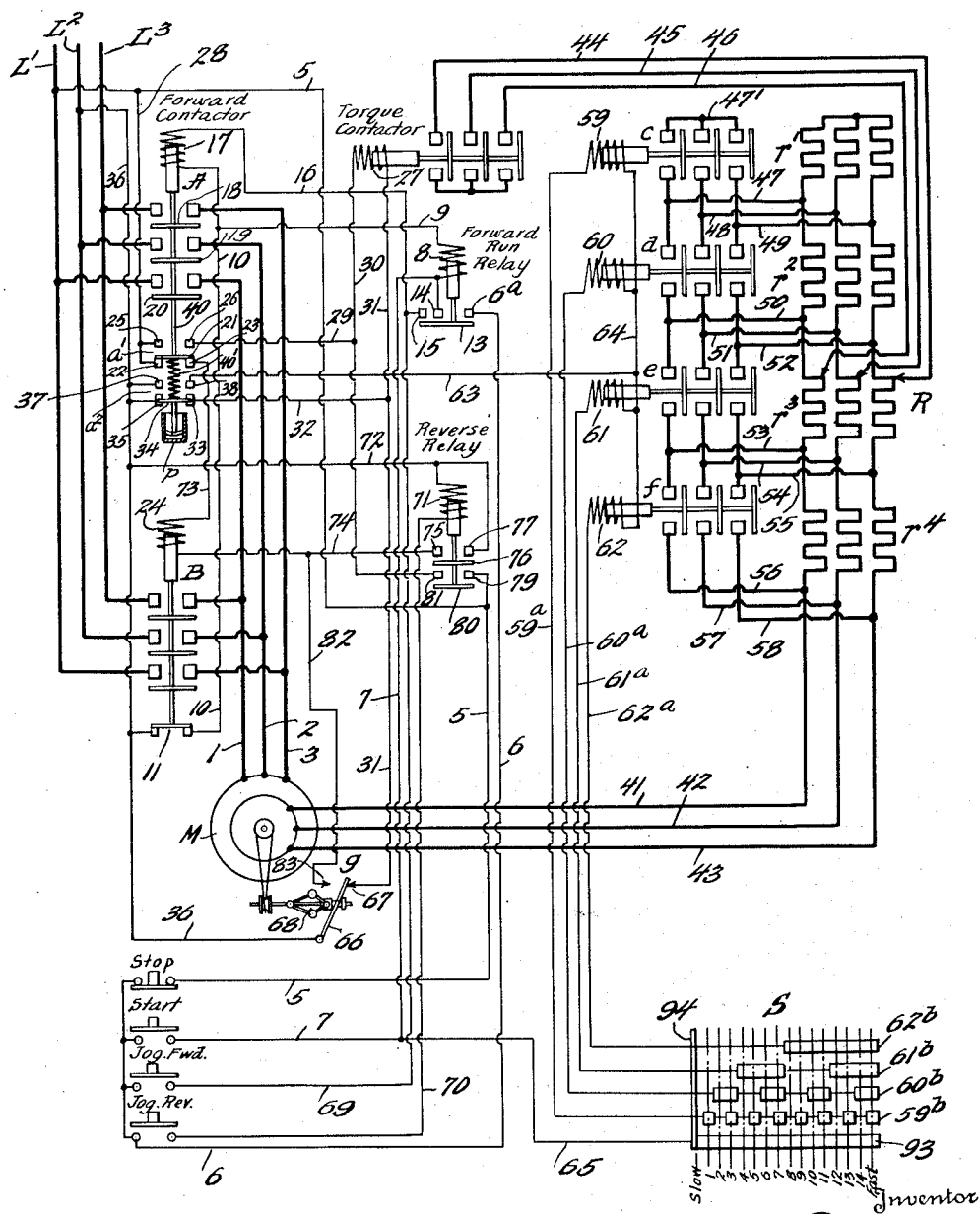

2,064,302

UNITED STATES PATENT OFFICE 2,064,302

SPEED CONTROL FOR ELECTRIC MOTORS

Joseph F. Frese, Baltimore, Md., assignor to Monitor Controller Company, Baltimore, Md., a corporation of Maryland Application February 25, 1935, Serial No. 8,194

5 Claims. (Cl. 172—289)

This invention relates to means for controlling alternating current motors of the slip-ring type used in driving printing presses or other machines which it may be desirable to operate at various speeds and to inch or jog forwardly or backwardly. In carrying out the invention, I provide a starting and regulating resistance in the rotor circuit of the motor, and a torque contactor for cutting out a part of this resistance in order that the motor may start its load with a heavy torque. In addition to the torque contactor, I provide a plurality of speed regulating contactors each adapted, when energized, to short-circuit a section of the resistance, to control the running speed of the motor and the machine which it drives. The magnet coils of these speed contactors are connected in multiple in a circuit which includes a manually adjustable switch by which all of the magnet coils may be included in the circuit, for operation of the motor at its highest speed, or all may be excluded for operation of the motor at its lowest speed, or the magnet coils may be included singly or in a number of different groupings to cause the motor to operate at various speeds between the highest and the lowest.

A main contactor, controlled by a push button switch, is provided for connecting the motor to the supply circuit for operation of the machine in the forward or normal direction, and this contactor, in closing, completes the circuit through the magnet of the torque contactor, which latter operates to short-circuit a part of the resistance for a brief period of time, when this circuit is opened by the main contactor and the latter then closes the circuit to the speed contactors. The speed contactors whose coils are connected in circuit through the manually adjustable switch are simultaneously energized and the motor then operates at a speed determined by the amount of resistance remaining in the rotor circuit.

The invention also includes means for jogging or inching the motor and its load forwardly or backwardly, as required in the operation of printing presses, as will be explained in the following specification.

In the accompanying drawing, wherein the invention is illustrated diagrammatically, M indicates a three-phase slip-ring motor, the stator of which is connected by wires 1, 2 and 3 to a contactor A which is adapted, when closed, to connect these wires to the supply wires L', L², L³, respectively, leading from a three-phase alternating current source. When so connected the motor operates forwardly or in the direction required for normal operation of the printing press, or other machine to which it may be geared. A contactor B is also provided for reversing the current phases in the motor to reverse its direction of rotation, this contactor, when closed, adapted to connect the conductors 1, 2 and 3 to the supply wires L³, L² and L', respectively.

The control circuit for the magnet of contactor A extends from supply wire L' by conductor 5 to a normally closed push button switch marked "Stop", thence by conductor 6 to the contact 6ª of a normally open relay switch marked "Forward Run Relay". A normally open push button marked "Start", is adapted, when closed, to connect conductor 6 to conductor 7 which leads to coil 8 of the forward run relay and from thence the circuit of said coil proceeds by conductor 9 to conductor 10, thence through normally closed switch 11, controlled by contactor B, to conductor 36 which leads to supply wire L². Upon closure of the start push button, therefore, the magnet of the forward run relay will be energized and its contact member 13 will connect contact 6ª with contacts 14 and 15. Contact 14 is connected to coil 8 and hence a holding circuit for the coil will be established from conductor 6, which is connected to supply wire L', through the coil and thence by conductors 9, 10, switch 11 and conductor 36 to supply wire L². The relay will also establish a circuit through the coil of contactor A, as follows: from supply wire L' through conductors 5 and 6 to contact 6ª, thence to contact member 13 and contact 15 to conductor 16, thence through coil 17 of the contactor, thence by conductor 10, closed switch 11 and conductor 36 to supply wire L². The contactor magnet will be energized and the contact members 18, 19 and 20 will be operated to connect the motor leads 1, 2 and 3 to the supply wires for operation of the motor in the forward direction. The motor will continue to operate until the stop push button is depressed to break the control circuit between conductors 5 and 6. This will cause de-energization of the magnet coil of the forward run relay and the relay switch will open its own holding circuit and the circuit to the magnet coil 17 of the forward contactor A. This contactor will then open the circuits leading to the stator of the motor causing the motor to stop. The contactor A, in addition to controlling the circuits to the stator of the motor, operates two switches a' and a². The switch a' comprises a movable contact member 21 which normally connects contacts 22 and 23 in a circuit which leads through coil 24 of contactor B which controls the backward rotation of the motor, as hereinafter described. When the contactor A is energized, this circuit is opened by contact member 21 so that the contactor B cannot be operated, and member 21 engages contacts 25 and 26, thus connecting coil 27 of a "Torque Contactor", so marked, to the supply wire L', as follows: from said supply wire through conductors 5 and 28 to contact 25, thence through contact member 21 and contact 26 to conductor 29, thence by conductor 30 to coil 27. From this coil the circuit continues through conductors 31 and 32 to contact 33 of switch $a^2$, thence through movable contact member 34 and stationary contact 35 to conductor 36 and thence to supply wire $L^2$. While the member 21 of the switch $a'$ moves immediately from contacts 22 and 23 to contacts 25 and 26, the member 34 of the switch $a^2$ is retarded in its upward movement by a dashpot $p$ and remains in engagement with the contacts 33 and 35 for a short period of time, thus holding the circuit of the magnet 27 of the torque contactor closed for a corresponding period of time. After leaving the contacts 33 and 35, the member 34 engages contacts 37 and 38 to make up a circuit to the magnets of contactors $c$, $d$, $e$ and $f$ which control the speed regulating resistance R, as hereinafter explained. For the purpose of securing the desired delay in the movement of the contact member 34, that member is shown, diagrammatically, as connected by a spring 40' to the rod 40 which is moved by the contactor A, so that when said contactor closes the member 34 will be moved by the spring and retarded by the dashpot.

A starting and regulating resistance R is connected to the rotor windings by leads 41, 42 and 43, and the torque contactor operates to connect conductors 44, 45 and 46 together and thereby short-circuit a part of the resistance, for starting the motor. These conductors may be connected so as to short-circuit any desired part of the resistance. As shown in the drawing, they are connected to the sections $r^3$, and when the contactor is closed the sections $r'$ and $r^2$ will be short-circuited. The ohmic resistance of the sections $r'$, $r^2$, $r^3$ and $r^4$ preferably increases geometrically in the order named.

Normally open contactors $c$, $d$, $e$ and $f$ are provided for short-circuiting sections of the resistance to control the speed of the motor. Thus, contactor $c$, when closed, will connect conductors 47, 48 and 49 together through conductor 47' and this will short-circuit section $r'$; contactor $d$, when closed, will connect conductors 47, 48 and 49 with conductors 50, 51 and 52 and short-circuit section $r^2$; contactor $e$, when closed, will connect conductors 50, 51 and 52 with conductors 53, 54 and 55 and short-circuit section $r^3$, and contactor $f$, when closed, will connect conductors 53, 54 and 55 with conductors 56, 57 and 58, respectively, and short-circuit section $r^4$. When all of the contactors are closed, all of the resistance will be short-circuited.

A circuit for the magnet coils 59, 60, 61 and 62 of the contactors $c$, $d$, $e$ and $f$, respectively, is controlled by the forward run contactor A. This circuit extends from the supply wire $L^2$ by conductor 36 to contact 37 of switch $a^2$ and from opposing contact 38, conductor 63 leads to conductor 64 which is connected to one terminal of each of said coils. Conductor $59^a$ connects coil 59 with a series of short contacts $59^b$ on a manually adjustable switch S which may be a drum controller. Eight of these contacts are shown spaced apart and electrically connected together. Conductor $60^a$ connects coil 60 to a parallel series of contacts $60^b$, four in number; conductor $61^a$ connects coil 61 with the spaced contacts $61^b$, and conductor $62^a$ connects coil 62 with the single relatively long contact $62^b$. A metal strip 93 is arranged parallel with the aforesaid series of contacts and a contact member 94, engaging the strip 93 and extending across the controller, is adapted to electrically connect the contacts to the strip 93 singly and in groups in the different relative positions of the contact member indicated in dotted lines, these positions or steps being further indicated by the words "Slow" and "Fast" at the ends of the series and by the intermediate numbers 1–14, inclusive. The strip 93 is connected by conductor 65 to conductor 7, which is part of the control circuit for the forward run relay, and when this relay is closed the contact strip 93 of the switch S is connected to the supply wire L' as follows: by conductors 65 and 7 to contact 14 of the forward run relay, thence through member 13 and contact $6^a$ to conductor 6, thence through the stop switch and conductor 5 to supply wire L'.

In addition to the circuit for the magnet coil 27 of the torque contactor which is closed promptly by the contact member 21 of the switch $a'$, when the contactor A is energized, and opened in a brief period of time thereafter by the slow moving contact member 34 of the switch $a^2$, there is another circuit for the magnet coil of the torque contactor paralleling the slow moving switch member, which circuit is automatically opened by the switch $g$ when the motor starts. As shown, the conductor 36 which is connected to contact 35 of the switch $a^2$ also extends to switch lever 66 which normally rests against stationary contact 67 connected by conductor 31 to the coil 27 of the torque contactor and also by conductor 32 to contact 33 of the switch $a^2$. When the contactor A closes, the switch $a'$ immediately closes the two circuits to the coil of the torque contactor. The timed contact member 34 of the switch $a^2$ operates to open the circuit in a predetermined time and the contact lever 66, movable by a centrifugal governor 68, driven by the motor, operates to open the parallel circuit to the torque contactor magnet after the motor has started and has gained a predetermined low speed. After the circuits have both been opened, if the motor slows down under its load and tends to stall, the centrifugally operated switch will close the circuit of the magnet of the torque contactor and the contactor will immediately cut the resistance which it controls out of the rotor circuit to give the motor more power.

The operation of the devices described, for the continuous rotation of the motor in the forward direction, is as follows: when the start push button is momentarily depressed, the magnet of the forward run relay is energized and this relay closes its own holding circuit and completes the circuit through the magnet coil of the forward contactor A. This contactor immediately completes the circuits to the stator of the motor and at the same time closes the circuit through the coil of the torque contactor at the switch $a'$. The torque contactor bridges a part of the resistance in the rotor circuit of the motor, causing the motor to start its load with a strong starting torque. After the motor has attained a pre-determined low speed the motor operated switch $g$ opens the torque contactor magnet circuit at that point, but the circuit to said magnet is still maintained by the slow moving contact member 34 of the switch $a^2$. This member then moves out of engagement with its lower contacts, interrupting the circuit to the torque contactor, which opens the bridge around the resistance which it controls, and the member 34 then engages the upper contacts 38 and 37, thus making up a circuit to the magnets of the speed controlling contactors $c$, $d$, $e$ and $f$. Such of these contactor magnets as are connected in the circuit at the pre-settable speed controlling switch S will be simultaneously energized and each of such contactors will operate to short-circuit the section of the resistance which it controls. Any contactor whose magnet coil is not connected in circuit by said switch will remain open and the section of resistance which it controls will remain included in the rotor circuit of the motor. Thus, in the position of the contact bar 94 marked "Slow", no one of the contacts connected to the contactor coils is engaged by the bar and hence no one of the contactors will be operated and all of the resistance will remain in the rotor circuit and the motor will run at its lowest speed. In the position of the contact bar marked "Fast", the bar engages a contact in each of the rows $59^b$ to $62^b$, inclusive, and in this position, the coils of all of the speed controlling contactors are in circuit, and all of the contactors will close, cutting out all of the resistance, and the motor will operate at its highest speed. In the successive relative positions of the contact bar 94, indicated by the numerals 1–14, inclusive, the contactor coils will be connected in circuit individually or in various groupings to cause the motor to operate at successively greater speeds. Thus, in position 1, the contact bar will engage only a contact in the row $59^b$, and only the coil 59 will be energized and contactor $c$ will close, cutting out section $r'$ of the resistance. In position 2, the bar will engage only a contact in the row $60^b$, and the contactor $d$ will operate to cut out resistance section $r^2$ only; in position 3, contactors $c$ and $d$ will operate simultaneously to cut out resistance sections $r'$ and $r^2$, respectively; in position 4, contactor $e$ only will operate; in position 5, contactors $c$ and $e$ will operate; in position 6, contactors $d$ and $e$ will operate; in position 7, contactors $c$, $d$ and $e$ will operate; in position 8, contactor $f$ only will operate; in position 9, contactors $c$ and $f$ will operate; in position 10 contactors $d$ and $f$; in position 11, contactors $c$, $d$ and $f$ will operate; in position 12, contactors $e$ and $f$ will operate; in position 13, contactors $c$, $e$ and $f$ will operate, and in position 14, contactors $d$, $e$ and $f$ will operate.

Should the motor, while starting in the forward direction, after the torque contactor has opened, slow down under its load to a very slow speed, the switch $g$ will close the circuit of the torque contactor magnet and this contactor will close again and cut out the resistance sections which it controls and the motor will gain speed and be prevented from stalling.

In order to stop the motor when it is running forwardly, the stop push button is depressed, thus opening the circuit leading from the supply wire L' through conductor 5 to conductor 6 and contact $6^a$ of the forward run relay. This interrupts the holding circuit of the relay coil and the relay opens, breaking the circuit to the coil 17 of the contactor A. This contactor opens and its contact members 18, 19 and 20 disconnect the motor leads from the supply wires. The contact member 34 of the switch $a^2$ opens the circuit to the speed control contactors and closes one side of the torque magnet circuit, while the contact member 21 of the switch $a'$ opens the other side of said circuit and bridges contacts 22 and 23, restoring the connection between the supply wire L' and the coil 24 of the reverse contactor B. The circuit for said coil then extends from said supply wire through conductors 5 and 28 to switch $a'$ and through conductor 73, coil 24 and conductors 74 and 82 to a contact 83 on the motor operated switch $g$. While the motor is operating, except at very low speed, the pivoted contact arm 66 engages the contact 83 and connects the conductor 82 to conductor 36 which leads to supply wire $L^2$. Hence, when contactor A opens, a circuit is made up through the coil of contactor B and this contactor closes and connects the stator leads of the motor to the supply wires, reversing the current phases in the motor and causing the motor to exert a reverse torque braking action which quickly stops the motor. As the motor slows down, the arm 66 of the switch $g$ moves away from contact 83, thus breaking the circuit to the coil of the reverse contactor, and the latter opens.

In order to inch or jog the press forward, a normally open push button switch marked "Jog Fwd" is provided and the circuit arrangement is such that as long as this button is depressed, the forward or main contactor A will be energized and the motor will turn in the forward direction, and upon release of the push button, this contactor will be de-energized and the motor will stop. The operation is the same as when the start push button switch is depressed except that the forward run relay is not energized and therefore a holding circuit is not established for the coil of the contactor A and this contactor will open as soon as the operator releases the jog forward push button switch. When this push button switch is closed, the conductor 5, leading from the supply wire L' is connected through conductor 6 and the push button switch to conductor 69 which leads to conductor 16 and to coil 17 of contactor A, and from said coil the circuit is continued through conductor 10, switch 11 and conductor 36 to supply wire $L^2$. The functions of the contactor A are the same as before described. Immediately upon its closure, the magnet of the torque contactor will be energized and the latter will operate to bridge a part of the resistance to give the motor a strong starting torque. If the push button switch is held closed long enough, the speed controlling contactors whose magnets may be in circuit through the switch S will also be energized; but, ordinarily, the delayed contact member 34 of the switch $a^2$ will not complete the circuit to the latter contactors before the operator releases the jog forward push button switch. When this switch is released, the contactor A opens and the motor stops.

In order to jog or inch the press in the reverse direction, a normally open push button switch marked "Jog Rev." is provided. This controls a circuit through the magnet coil of a "Reverse Relay", so marked, as follows: from supply wire L' through conductors 5 and 6 and said switch to conductor 70, thence through coil 71 of said relay and conductor 72 to conductor 36 and thence to supply wire $L^2$. As long as the switch is closed, the relay coil will be energized and when the switch is opened, the coil will be de-energized. When the relay is energized, it closes a circuit through the coil 24 of contactor B as follows: from supply wire L' through conductors 5 and 28, contacts 22, 21 and 23 of switch $a'$, conductor 73 to coil 24 of contactor B, conductor 74 to contact 75 of reverse relay, thence through contact member 76 and contact 77 to conductor 72 and thence through conductor 36 to supply wire L². When this circuit is closed, contactor B will operate to connect the supply wires L', L² and L³ to the motor leads 3, 2 and 1, respectively, and it will also open the switch 11, breaking the circuit of the coil of contactor A so that the latter cannot operate. The reverse relay, when closed, will also complete a circuit to the coil 27 of the torque contactor as follows: from supply wire L' through conductor 5 to relay contact 78, thence through contact member 80 and contact 81 to conductor 30, thence through coil 27 and conductors 31 and 32 to contacts 33, 34 and 35 of switch $a^2$ and thence by conductor 36 to supply wire L². Hence, while the jog reverse switch is held closed, the motor will be connected for reverse rotation and the torque contactor will be energized and the resistance which it controls in the rotor circuit will be short-circuited, giving the motor a strong starting torque. During this operation, the speed control contactors are not operated because the circuit to the coils of these contactors is open at the switch $a^2$.

What I claim is:

1. The combination with an alternating current motor, a starting and regulating resistance in the rotor circuit thereof, and a current supply circuit, of a main contactor for connecting the motor to the supply circuit, a torque contactor adapted, when closed, to cut out a part of said resistance, a plurality of speed controlling contactors, each adapted to cut out a section of said resistance, a circuit for the magnet of the torque contactor, a circuit for the magnets of the speed controlling contactors, means operated by the main contactor, in closing, for first closing the circuit to the torque contactor magnet and then closing the circuit to the magnets of the speed controlling contactors.

2. The combination with an alternating current motor, a starting and regulating resistance in the rotor circuit thereof, and a current supply circuit, of a main contactor for connecting the motor to the supply circuit, a torque contactor adapted, when closed, to cut out a part of said resistance, a plurality of speed controlling contactors, each adapted to cut out a section of said resistance, a circuit for the magnet of the torque contactor, a circuit for the magnets of the speed controlling contactors, means controlled by the main contactor, in closing, for closing and then opening the circuit to the torque contactor magnet and then closing the circuits to the magnets of the speed controlling contactors.

3. The combination with an alternating current motor, a starting and regulating resistance in the rotor circuit thereof, and a current supply circuit, of a main contactor for connecting the motor to the supply circuit, a torque contactor adapted, when closed, to cut out a part of said resistance, a plurality of speed controlling contactors, each adapted, when energized, to cut out a section of said resistance, a circuit for the magnet of the torque contactor, a circuit for the magnets of the speed controlling contactors, an adjustable speed controlling switch for connecting the latter magnets singly or in various groupings in the last mentioned circuit, means operated by the main contactor, in closing, for first closing the circuit to the torque contactor magnet and then closing the circuit to the magnets of the speed controlling contactors.

4. The combination with an alternating current motor, a starting and regulating resistance in the rotor circuit thereof and an alternating current source, of a main contactor for connecting the motor to said source, a torque contactor adapted, when closed, to cut out a part of said resistance, a circuit for the magnet of the latter contactor, means controlled by the main contactor for closing said circuit when the main contactor closes and for opening said circuit in a pre-determined period of time after said circuit has been closed, and a switch operated by the motor adapted to close the torque contactor circuit, after it has been opened by the main contactor, if the motor slows down under its load to a very low speed.

5. The combination with an alternating current motor, a starting and regulating resistance in the rotor circuit thereof and a current supply circuit, of a main contactor for connecting the motor to the supply circuit, a control circuit for said contactor including a normally open relay for holding said control circuit closed and a start switch for connecting the magnet coil of said relay to the supply circuit, a torque contactor adapted, when closed, to cut out a part of said resistance, a plurality of speed controlling contactors, each adapted to cut out a section of said resistance, a circuit for the magnet of the torque contactor, a circuit for the magnets of the speed controlling contactors, and means operated by the main contactor, in closing, for closing and then opening the circuit to the torque contactor magnet and then closing the circuits to the magnets of the speed controlling contactors.

JOSEPH F. FRESE.